W. J. A. LONDON.
TURBINE.
APPLICATION FILED AUG. 7, 1911.
1,036,866.
Patented Aug. 27, 1912.
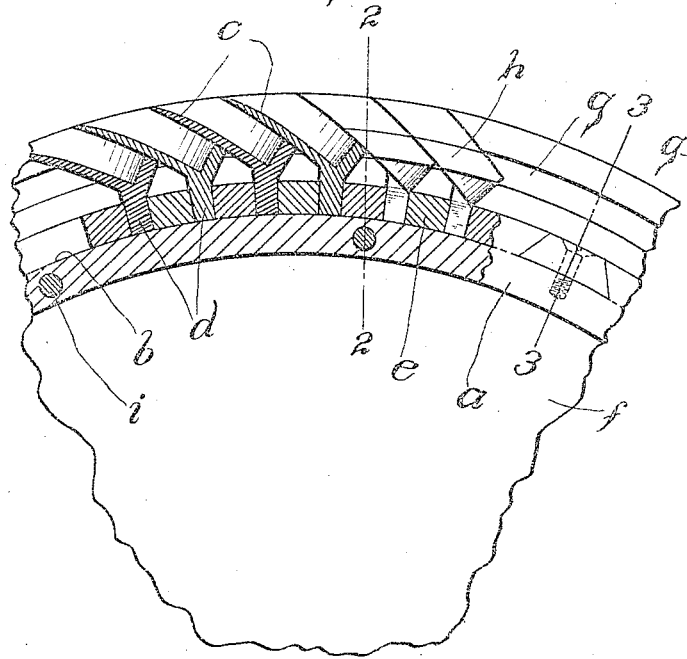
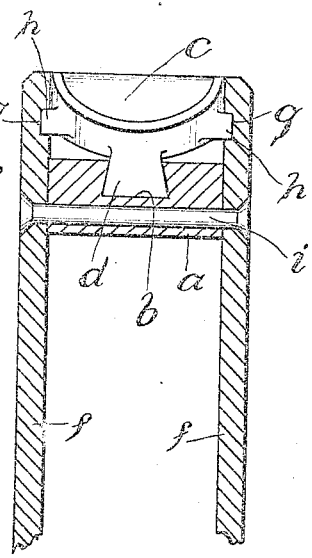
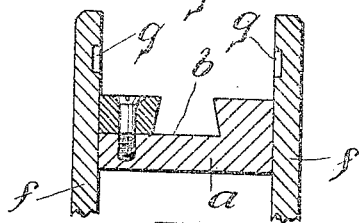
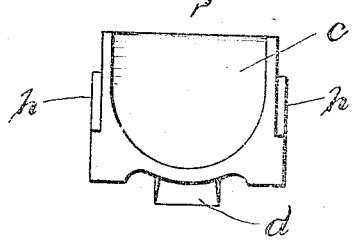
WITNESSES:
Louis Lucia.
M.A. Shuckerow.
INVENTOR.
W.J.A. London
BY
HIS ATTORNEY.

UNITED STATES PATENT OFFICE.

WILLIAM J. A. LONDON, OF HARTFORD, CONNECTICUT.

TURBINE.

1,036,866.

Specification of Letters Patent.

Patented Aug. 27, 1912.

Application filed August 7, 1911. Serial No. 642,647.

*To all whom it may concern:*

Be it known that I, WILLIAM J. A. LONDON, a subject of the King of England, and a resident of Hartford, in the county of Hartford and State of Connecticut, have invented certain new and useful Improvements in Turbines, of which the following is a specification.

This invention relates more particularly to the construction of the rotor of fluid actuated turbines, especially such as are used in turbines of the "Terry" type where the mouth of the bucket opens at the periphery of the rotor.

The object of the invention is to produce a rotor of novel construction.

Referring to the drawings—Figure 1 is a side view of part of the rotor with one side plate removed showing some of the buckets in central section and others in side elevation. Fig. 2 is a sectional view on the line 2, 2 of Fig. 1. Fig. 3 is a detail sectional view of the side plates and base ring on the line 3, 3 of Fig. 1. Fig. 4 is a top view of one of the buckets.

Rotors made in accordance with my invention comprise a base ring $a$ having a central circumferential groove $b$ which is preferably of dove-tail form as indicated in Fig. 2, buckets $c$ having tangs $d$ adapted to fit in the groove $b$, spacing blocks $e$ to space the buckets one from another, and side plates $f, f$ circumferentially grooved on their opposing surfaces near their outer edges as indicated at $g \; g$ to receive the side ribs $h \; h$ on the buckets. Bolts $i$ pass through the base ring and side plates, their ends being riveted over to tie the structure together.

It will be noted that the buckets are arranged in step formation about the periphery of the rotor and the structure is assembled by sliding the buckets into place on the base ring with their tangs in the groove, spacing them apart by the spacing blocks, then fitting the side plates so that the grooves $g \; g$ receive the ribs $h \; h$ and finally in tying the structure together with the bolts $i$.

There is thus provided a rotor which can be readily and accurately assembled, requiring the least amount of machining work and producing a strong rigid structure.

I claim as my invention:

1. A rotor comprising a base ring having a circumferential groove, buckets provided with tangs adapted to fit said grooves, spacing blocks between said tangs, side plates having circumferential grooves in their opposing surfaces near their outer edges, ribs on said buckets adapted to lie in said grooves, and means for securing the parts together.

2. A rotor comprising a base ring circumferentially grooved, buckets provided with tangs fitting in said groove, and side plates between which said ring and buckets are secured.

3. A rotor comprising a base ring circumferentially grooved, buckets provided with tangs fitting in said grooves, side plates between which said ring and buckets are secured, and interengaging parts on said buckets and side plates.

WILLIAM J. A. LONDON.

Witnesses:
J. D. STOUT,
E. T. FITZ-GERALD.